(12) United States Patent
Betzler et al.

(10) Patent No.: US 10,947,091 B2
(45) Date of Patent: Mar. 16, 2021

(54) STOP POINT FOR INSERTING INTO AN UNDERCUT OPENING

(71) Applicant: RUD Ketten Rieger & Dietz GmbH u. Co. KG, Aalen (DE)

(72) Inventors: Michael Betzler, Abtsgmünd (DE); Andreas Wendler, Aalen (DE)

(73) Assignee: Rud Ketten Rieger & Dietz GmbH u. Co. KG, Aalen (DE)

( * ) Notice: Subject to any disclaimer, the term of this patent is extended or adjusted under 35 U.S.C. 154(b) by 139 days.

(21) Appl. No.: 16/312,055

(22) PCT Filed: Jun. 16, 2017

(86) PCT No.: PCT/EP2017/064741
§ 371 (c)(1),
(2) Date: Dec. 20, 2018

(87) PCT Pub. No.: WO2017/220438
PCT Pub. Date: Dec. 28, 2017

(65) Prior Publication Data
US 2019/0202669 A1 Jul. 4, 2019

(30) Foreign Application Priority Data
Jun. 21, 2016 (DE) .................... 10 2016 211 078.0

(51) Int. Cl.
*B66C 1/66* (2006.01)
*F16G 15/08* (2006.01)
*F16M 13/02* (2006.01)

(52) U.S. Cl.
CPC ............... *B66C 1/66* (2013.01); *F16G 15/08* (2013.01); *F16M 13/02* (2013.01)

(58) Field of Classification Search
CPC .................................. B66C 1/66; F16M 13/02
(Continued)

(56) References Cited

U.S. PATENT DOCUMENTS 2,730,687 A    1/1956  Modrey
4,079,983 A *  3/1978  Van Mastrigt ............ B66C 1/66
                                                    294/89

(Continued)

FOREIGN PATENT DOCUMENTS

CN    201670653 U    12/2010
CN    203833485 U     9/2014
(Continued)

OTHER PUBLICATIONS

German Search Report, dated Feb. 13, 2019, for German application No. DE 10 2016 211 078.0.
(Continued)

*Primary Examiner* — Paul T Chin
(74) *Attorney, Agent, or Firm* — Barnes & Thornburg LLP; Jeffrey R. Stone

(57) ABSTRACT

The invention relates to a stop point for inserting into an undercut opening. The stop point has a stop region for stopping a lashing, lifting, or stopping article, a shaft which extends along a shaft longitudinal axis away from the stop region for inserting into the opening, and a holding protrusion on the shaft end facing away from the stop region, the protrusion protruding transversely to the shaft longitudinal axis (L). In order to improve the reliability of stop points and in particular the axial load-bearing capacity, the holding protrusion is immovably connected to the shaft according to the invention.

13 Claims, 7 Drawing Sheets

(58) Field of Classification Search
USPC .............. 294/216, 89, 82.1, 82.22; 248/499; 410/101
See application file for complete search history.

(56) References Cited

U.S. PATENT DOCUMENTS

| | | | | |
|---|---|---|---|---|
| 4,315,651 | A * | 2/1982 | Endicott, Jr. ............ | B63C 7/16 24/573.11 |
| 4,630,982 | A * | 12/1986 | Fenner ................ | B61D 45/001 410/102 |
| 6,585,465 | B1 | 7/2003 | Hammond et al. | |
| 9,233,816 | B1 * | 1/2016 | Mendez .................... | B66C 1/66 |
| 10,131,523 | B2 * | 11/2018 | Smetz ................... | B60P 7/0807 |
| 2002/0005645 | A1 * | 1/2002 | Zuliani .................... | B66C 1/66 294/215 |
| 2019/0202670 | A1 * | 7/2019 | Jackson .................... | B66C 1/66 |

FOREIGN PATENT DOCUMENTS

| | | |
|---|---|---|
| DE | 8814211 | 1/1989 |
| FR | 2762815 | 11/1988 |

OTHER PUBLICATIONS

Second Chinese Office Action (including English translation), dated Apr. 13, 2020 in Chinese Application No. 201780039039.4.

* cited by examiner

STOP POINT FOR INSERTING INTO AN UNDERCUT OPENING

The invention relates to a stop point for inserting into an undercut opening, wherein the stop point has a stop region for stopping a lashing, lifting, or stopping means, a shaft which extends along a shaft longitudinal axis away from the stop region for inserting into the opening, and a holding protrusion on the shaft end facing away from the stop region, said protrusion protruding transversely to the shaft longitudinal axis.

Stop points for insertion into undercut openings are known. On the one hand, they can be used to lift or lash loads, but also to secure loads or persons. For example, when working on facades or on roofs, it is often desirable when a stop point is not solidly mounted on an object such as a building. For this reason, stop points are used for insertion which can be quickly and easily inserted into an undercut opening. Preferably, the stop points can also be quickly and easily removed from the opening. The opening can be a bore whose cross-section widens at one point so that an undercut is formed. It may also be possible to first insert a corresponding sleeve into a drilled hole in an object such as a wall or ceiling so that there is an opening with a corresponding inner diameter and an undercut for the stop point.

The known stop points usually have opposite elements, such as balls or cylinders which can be deflected transversely to the shaft longitudinal axis, for interlocking with an undercut of an opening at the end of the shaft facing away from the stop area. Said elements can be arranged in the shaft interior during inserting the shaft into the opening and can be deflected from the shaft interior when reaching an end position so that they project beyond the shaft and are arranged in an undercut of the opening. This secures the stop point in the opening. A disadvantage of these known forms of stop points, however, is that the deflectable elements, which protrude into the undercut of the opening and hold the stop point there, are not sufficiently axially loadable, thus, parallel to the shaft longitudinal axis. In particular, a tensile load on the stop point can lead to deformation of the elements and/or corresponding counterparts in the shaft interior so that the stop point is released from the opening.

It is therefore the object of the invention to provide a stop point of the type mentioned above the axial load-bearing capacity of which is improved and which is at the same time easy to handle and inexpensive to manufacture.

For a stop point of the type mentioned above, the problem according to the invention is solved by the fact that the holding protrusion is immovably connected to the shaft.

In contrast to the known state of the art, the stop point according to the invention thus does not have a movable or deflectable holding protrusion. The immovable, thus fixed, connection of the holding protrusion with the shaft leads to a high stability of the holding protrusion and thus to a high axial load-bearing capacity.

The solution according to the invention can be further improved by different, in each case advantageous, arbitrarily intercombinable embodiments. These forms of embodiments and the advantages associated with them are described below.

According to a first advantageous embodiment, the holding protrusion can be monolithically formed with the shaft. This makes it particularly easy to create an immovable connection. Monolithic means that the holding protrusion was not initially manufactured as a separate part and subsequently attached to the shaft.

According to another advantageous embodiment, the shaft can be immovably connected to the stop region. In particular, the stop region and the shaft may be monolithically formed. The shaft is preferably not initially manufactured as a separate part and subsequently connected to the stop region.

Said stop region of the stop point can be used for stopping a lashing, lifting or stopping means. For this purpose, it can, for example, have an eye. Alternatively, instead of an eye, the stop region can also have a hook, a carabiner, a shackle, or a connection point for connecting to another part.

The stop region can also be rotatably mounted opposite the shaft. For example, a bearing can be arranged between the stop region and the shaft to allow rotation. In particular, the stop point can have a rolling bearing or a slide bearing. For this purpose, the stop point can have a bearing sleeve through which the shaft protrudes and which in turn is surrounded by the stop area.

It is preferable if the stop region, the shaft, and the holding protrusion are immovable relative to each other. These three elements can also be formed in one piece with each other. For example, the stop point can be formed as a forged part. The forming of an initial material by forging can lead to a high load-bearing capacity of the stop point so that in particular the axial load-bearing capacity can be improved particularly in the region of the holding protrusion.

Alternatively, the stop point can also be formed as a cast part or produced by other appropriate methods.

The holding protrusion of the stop point according to the invention is preferably formed eccentrically to the shaft. In this way, a simply constructed and at the same time loadable holding protrusion can be obtained. In particular, the holding protrusion can have a circular cross-section and be offset from the rest of the shaft by the eccentricity transverse to the shaft longitudinal axis.

In order to avoid an unintentional release of the stop point from the undercut opening, the stop point may have at least one support element between the holding protrusion and the stop region, the holding protrusion and the at least one support element being movable relative to one another. The at least one support element can be arranged after the insertion of the stop point into an undercut opening between an inner wall of the opening and the remaining stop point or shaft so that a movement of the stop point, in particular of the shaft in the opening, transverse to the longitudinal direction of the shaft is prevented. This means that the holding protrusion at the end of the shaft can engage securely in the undercut of the opening and cannot slide into the opening itself. The term inner wall of the opening refers to a wall surrounding or exposing the opening.

The stop point can be held particularly reliable in the opening, if there is a holding position in which the at least one support element and the holding protrusion are arranged diametrically opposite each other with respect to the shaft longitudinal axis.

The at least one support element may, for example, be arranged in the holding position in such a way that it presses or is pressed against the inner wall. This means that the stop point can be held in a non-positive manner in addition to the positive locking. In particular, a rotation of the stop point around the shaft longitudinal axis can be prevented.

Alternatively, at least one support element can abut the inner wall of the opening only loosely in a holding position to prevent tilting of the stop point in the opening. This allows the stop point to be held in the opening so that it can rotate about the shaft longitudinal axis.

A locking device may be provided by which the stop point is secured in the holding position. The locking device can, for example, ensure that the support element remains in the holding position so that the function of the support element is guaranteed.

In order to prevent the stop point from tilting transversely to the shaft longitudinal axis and to improve the support of the stop point in the opening, the shaft may have at least two support elements spaced apart along the shaft longitudinal axis.

The two support elements can support the stop point particularly well, or secure its position, if a first support element is arranged on a shaft-side contact surface of the stop region and a second support element is arranged on the holding protrusion. In other words, the support elements should be arranged as close as possible to these elements. Thus, the support elements are arranged in an inserted state of the stop point near the opposite ends of the opening. If the support elements then abut against an inner wall of the opening or press against it, tilting of the stop point in the opening can be effectively prevented. In order to arrange the support elements as close as possible to the contact surface or to the holding protrusion, they are preferably not more than one-fifth of a shaft diameter away from these elements.

In order to facilitate the insertion of the stop point into the undercut opening and to provide a stop point that is as compact as possible, at least one support can be moved out of the shaft. This means that in order to insert the stop point into the opening, at least one support element can be moved into the shaft so far that the stop point can pass through the opening. If the stop point is inserted in the opening, the support element can be moved out of the shaft so that it can abut or be pressed against an inner wall of the opening. In particular, the at least one support element can penetrate a wall of the shaft transverse to the shaft longitudinal axis. The shaft may have at least one penetration opening for the at least one support element. The at least one support element preferably penetrates the shaft in such a way that it is held captive to the shaft in order to avoid loss of the at least one support element.

In order to achieve a particularly effective pressing of the at least one support element against a wall of the opening, the at least one support element may have the shape of a cylinder surface on an outside. This can in particular be formed in such a way that it can abut substantially seamlessly against an inner wall of the opening. For example, the radius of the cylinder can correspond approximately to the radius of the opening.

In order to actuate or control the at least one support element from the outside, the stop point may have an actuating element which is accessible at the stop region and which is coupled in a force-transmitting manner to the at least one support element. For example, the actuating element can be designed in such a way that it can be moved between an insertion position and a holding position. Before the stop point is inserted into the opening, the actuating element can be brought into the insertion position so that the at least one support element is not arranged in the holding position. The stop point can then be easily inserted into the opening. Once the stop point has been inserted in the opening, the actuator can be actuated or moved to the stop position, exerting a force on at least one support element and also bringing it into the stop position. Then, the at least one support element abuts against the inner wall of the opening or is pressed against it, thus, securing the stop point in both openings.

A particularly compact stop point can be obtained by the fact that at least one actuating element is configured as a spindle arranged in the shaft interior, the axis of rotation of which is coaxial with the shaft longitudinal axis. A rotation movement of the actuating element, i.e. a rotation about the shaft longitudinal axis, can then be converted into a movement of at least one support element. If the support element is configured in such a way that it can be moved out of the shaft transversely to the shaft longitudinal axis, the rotation of the actuating element can lead to a translation of the at least one support element transversely to the shaft longitudinal axis.

The spindle, which may in particular be pin-shaped, may have a cross-section deviating from a circular shape in at least one force transmission section for the transmission of force to at least one support element. For example, the cross-section may be elliptical.

When viewed in a longitudinal section, the spindle can have at least one recess in which the cross-section is reduced. The recess may form a cross-sectional flattening when viewed in a cross-section transverse to the shaft longitudinal axis. In particular, this allows at least one support element which can be moved out of the shaft, to be moved. In an insertion position, at least one support element can be arranged in the recess in the spindle so that the support element is arranged sufficiently far in the shaft to insert it into the opening. In order to fix the stop point in the opening, a rotation of the actuating element can cause the rotation of the force transmission section to move the support element out of the shaft. In a holding position, the support element is preferably arranged in such a way that it abuts a non-flattened region of the spindle. Alternatively, the spindle can also be formed eccentrically in at least one force transmission section.

The rear sides of the support elements may have cross-sectional widenings extending transversely to the shaft longitudinal axis, which may serve to prevent the support elements from falling out of the shaft or through the penetration openings. As counterparts to the cross-sectional widenings, the shaft can have pressure partings in the region of the at least one penetration opening which prevent the support element from falling out of the shaft by positive locking with the cross-sectional widenings. These can be formed after insertion of the support element into the penetration opening on the shaft.

For particularly easy operation of the actuating element, it can have a lever extending radially away from the shaft longitudinal axis which can be used in the stop region. For this purpose, the stop point may have at least one window in the stop region through which the lever of the actuating element projects outwards. The slot of the window can in particular run transversely to the shaft longitudinal axis.

In order to increase the safety of the stop point, the stop point may have at least one return element which is coupled to the at least one actuating element and by means of which the actuating element can be moved into the holding position. This allows the holding position to be selected as the preferred position so that, if no external force is exerted on the actuator, it is always moved to the holding position by the return element. The return element can be a locking device for the stop point.

A particularly simply structured return element can be obtained by the fact that it is configured as a spring arranged in the shaft interior, which is connected to both the shaft and the actuating element by means of a spring force. The spring can be preloaded in such a way that it always generates a spring force in the direction of the holding position.

If the stop point has a lever belonging to the actuating element, which lever is accessible from the outside in the stop region, the stop point can also have an external spring alternatively or in addition to an internal spring, which spring is arranged in the region between a slot-shaped window of the stop point and the contact surface of the stop region. One end of the spring can then be attached to the lever and the other end can be attached to the stop point. The spring can be preloaded in such a way that it exerts a spring force in the direction of the holding position. The spring is preferably configured as a spiral spring, which is wound at least once around an outer surface of the stop point.

In the following, the invention is explained in more detail with reference to the drawings by means of preferred embodiments. The feature combinations exemplarily shown in the embodiments can be supplemented with further features for a specific application case in accordance with the above explanations. In accordance with the above explanations, individual features can also be omitted from the described embodiments if the effect of this feature in a specific application case is not important.

The same reference signs are consistently used in the drawings for elements with the same function and/or structure.

Therein:

In the following, the coarse structure of a stop point 1 according to the invention is described on the basis of FIG. 1.

Figure 1:
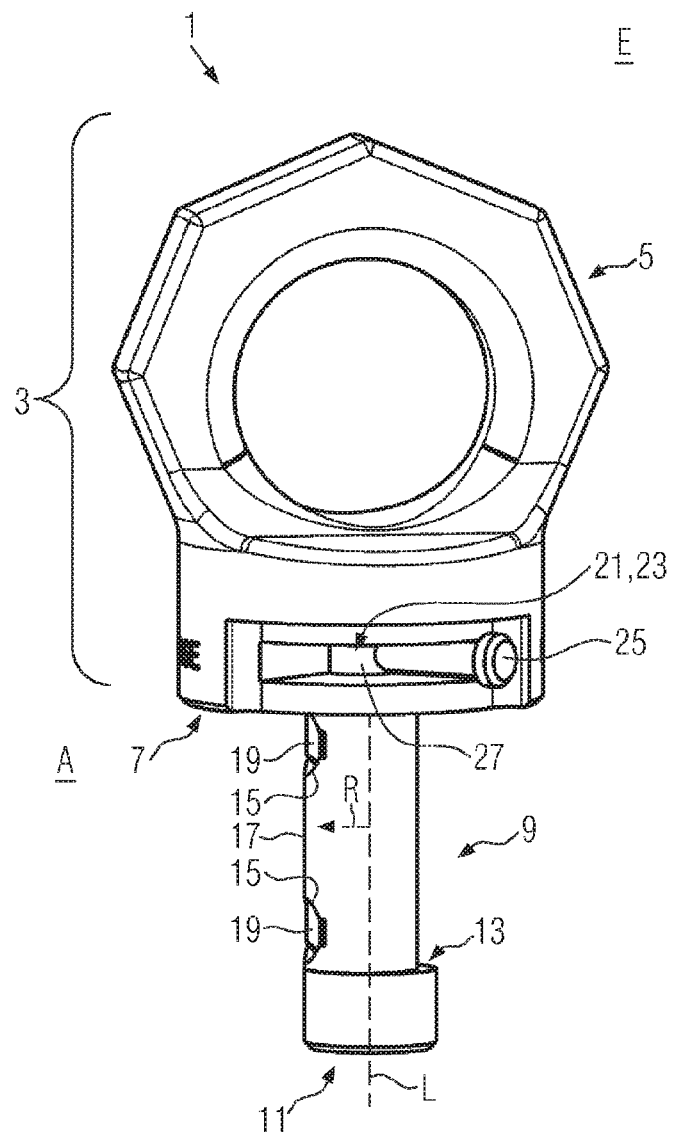
FIG. 1 shows a first embodiment of a stop point according to the invention in an insertion position in a perspective view.
Figure 2A:
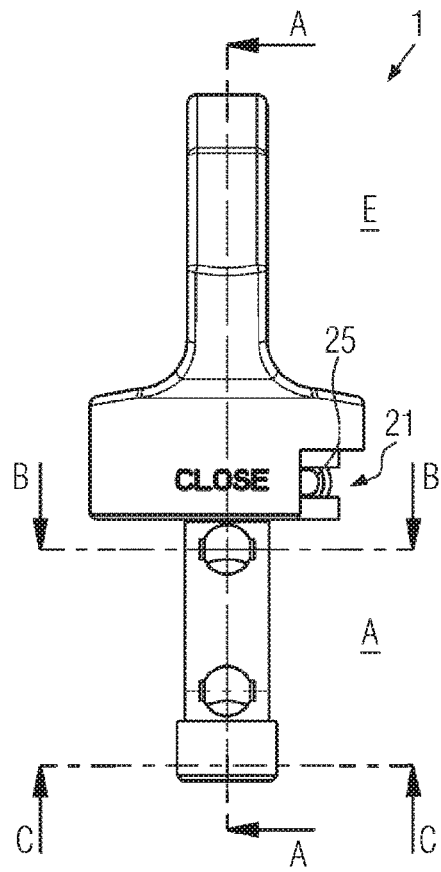
FIG. 2a shows the stop point of FIG. 1 in a side view and in different sectional views.
Figure 2B:
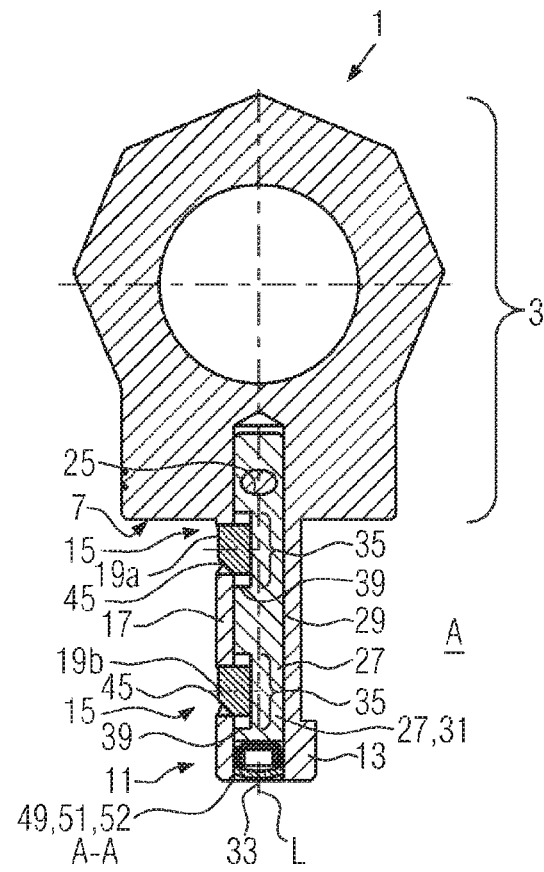
FIG. 2b shows the stop point of FIG. 1 in a longitudinal section.
Figure 2C:
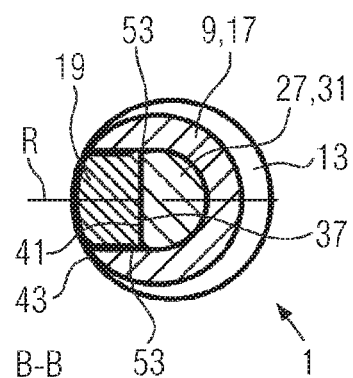
FIG. 2c shows the stop point of FIG. 1 in a cross section in the region of the holding protrusion.
Figure 2D:
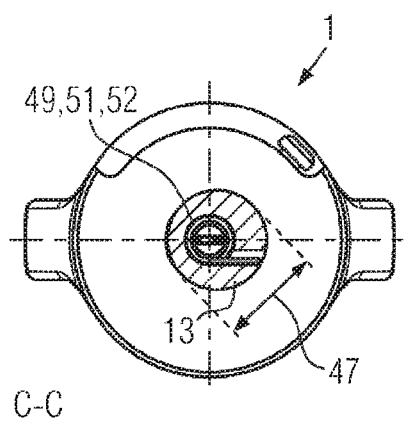
FIG. 2d shows the stop point of FIG. 1 in a cross section in the region of a support element.
Figure 3:
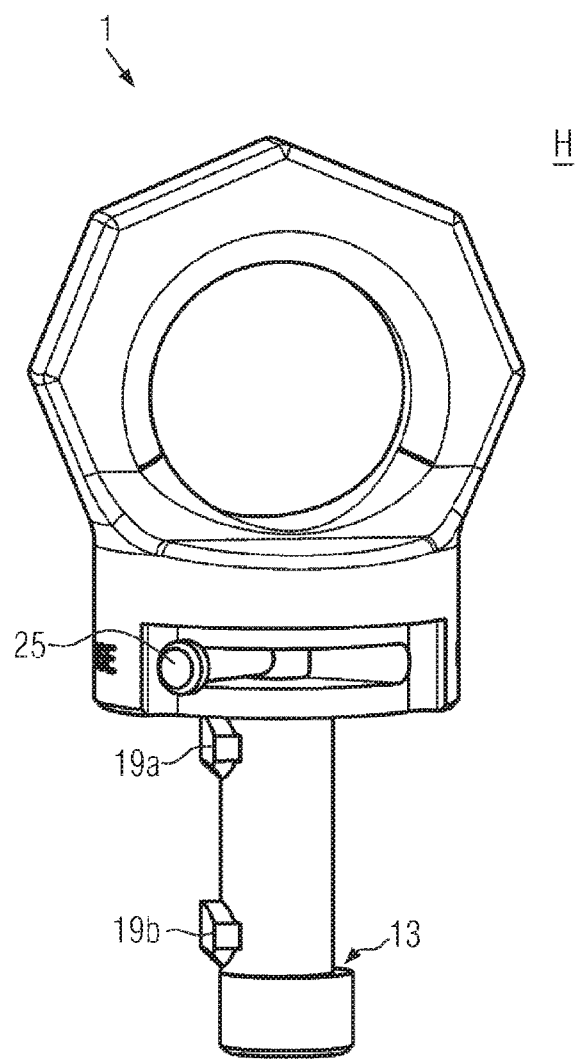
FIG. 3 shows the stop point of FIG. 1 in a holding position in a perspective view.
Figure 4A:
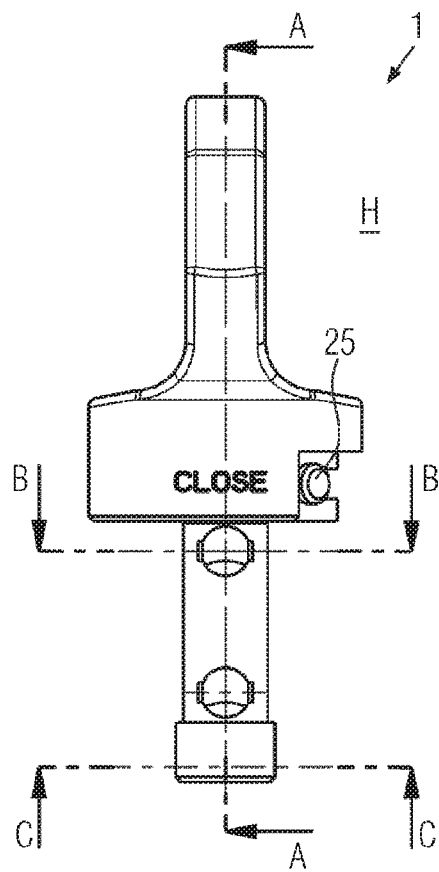
FIGS. 4a-4d show the stop point in the holding position of FIG. 3 in different views according to FIGS. 2a-2d.
Figure 4B:
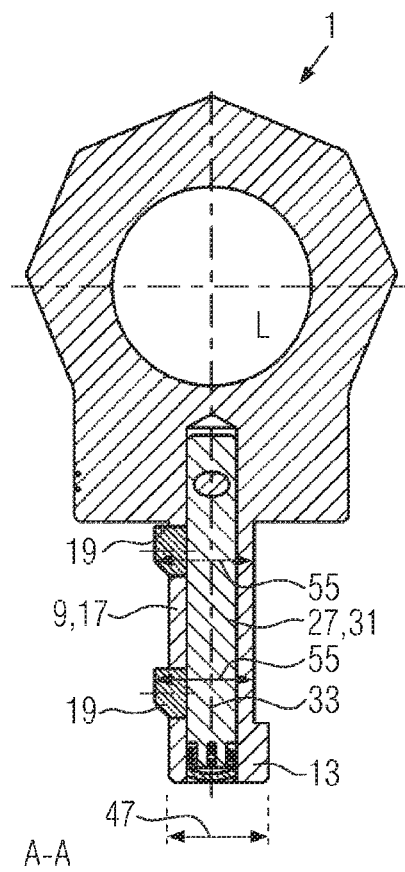
Figure 4C:
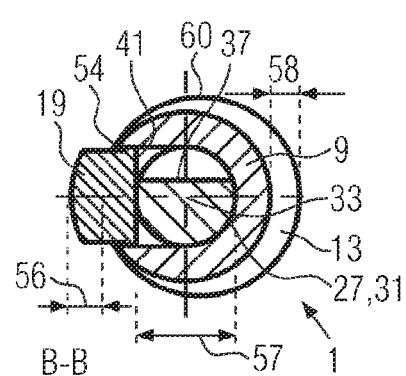
Figure 4D:
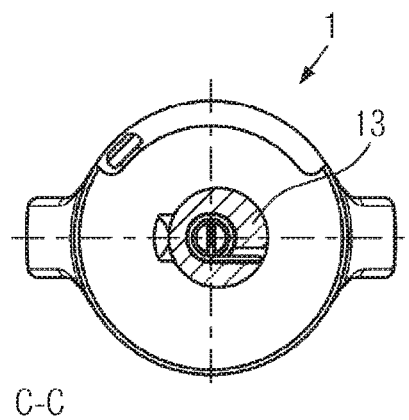
Figure 5A:
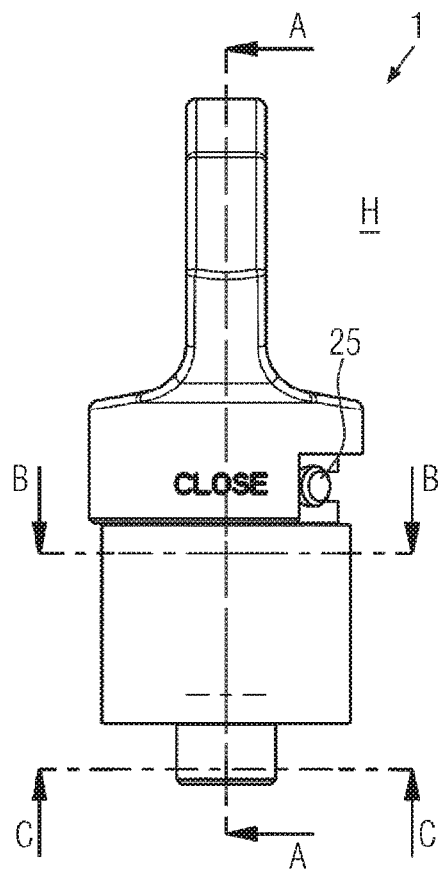
FIGS. 5a-5d show the stop point in the holding position according to FIG. 4 in a position attached to an object in different views according to FIGS. 2a-2d.
Figure 5B:
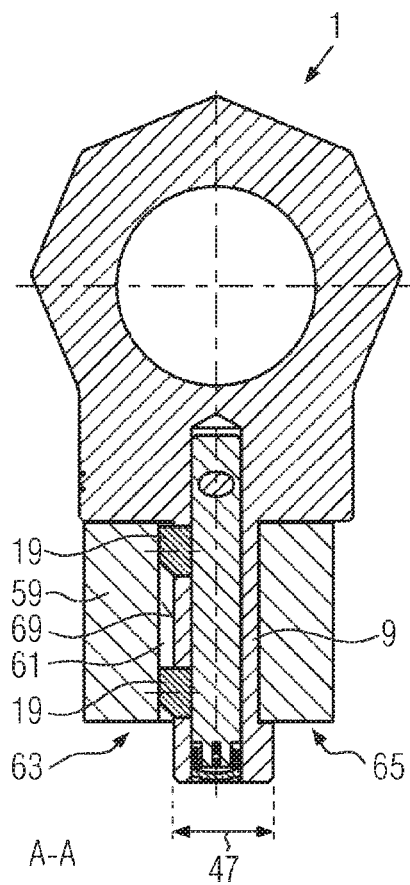
Figure 5C:
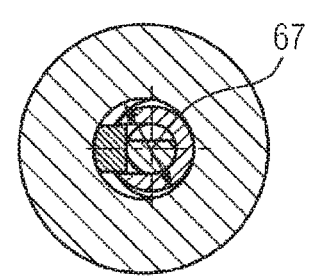
Figure 5D:
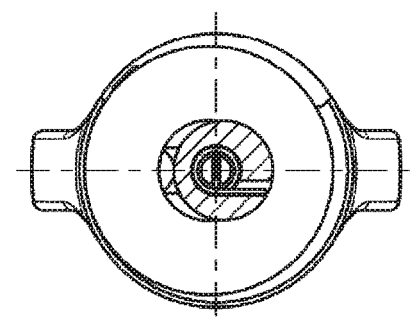

FIG. 1 shows a first preferred embodiment of a stop point 1 according to the invention in an insertion position E. The stop point 1 has a stop region 3. The stop region 3 can be used for stopping a lashing, lifting or stopping means (not shown). For this purpose, it preferably has an eye 5. Alternatively, the stop region 3 can also have a hook, a carabiner, a shackle or a connection point for connection to another part instead of an eye.

The stop region 3 further has a contact surface 7 for contact with an object. The shaft 9 extends from the stop region 3 and can be inserted into an undercut opening. The shaft 9 extends longitudinally along a shaft longitudinal axis L. The contact surface 7 is preferably arranged perpendicular to the shaft longitudinal axis L.

At the end 11 of the shaft 9 facing away from the stop region 3, the stop point 1 exhibits the holding protrusion 13. The holding protrusion 13 projects transversely to the shaft longitudinal axis L from the remaining shaft 9. The holding protrusion 13 is formed immovably with the shaft 9. In the embodiment shown, the shaft 9 is also formed immovably with the stop region 3. This means that the stop region 3 is immovably connected to the shaft 9 and the latter to the holding protrusion 13. The holding protrusion 13, the shaft 9, and the stop region 3 are preferably formed monolithically with each other, for example by forging.

The shaft 9 exhibits two penetration openings 15 in a wall 17. Inside of these, support elements 19 can penetrate the wall 17 of the shaft 9. The support elements 19 and their function are described in more detail in FIGS. 2a-2d, 4a-4d, and 5a-5d. In the insertion position E, the support elements 19 are preferably arranged so far in the shaft 9 that they do not extend outwards A in the radial direction R over the wall 17 of the shaft 9.

In the stop region 3, preferably between the contact surface 7 and the eye 5, the stop point 1 has the slot-shaped window 21. The slot 23 of the slot-shaped window 21 extends radially to the shaft longitudinal axis L and thus parallel to the contact surface 7. A lever 25 of the actuating element 27 can be moved in the slot 23. The support elements 19 can be moved by actuating the actuating element 27. This is described with reference to FIGS. 2a-2d.

FIGS. 2a-2d show the stop point of FIG. 1 in a side view with a view direction to the support elements 19 and in three different sectional views, wherein the corresponding sections are drawn in the side view. As FIG. 1, FIGS. 2a-2d show the stop point 1 in the insertion position E.

The actuating element 27 extends along the shaft longitudinal axis L through the shaft interior 29, which is delimited to the outside A by the wall 17. The actuating element 27 is preferably configured as a pin-shaped spindle 31. Thereby, an axis of rotation 33 of the spindle 31 is arranged coaxially to the shaft longitudinal axis L. The shaft interior 29, for example, can be formed by a blind hole which extends from the end 11 facing away from the stop region to the stop region 3.

In the stop region 3 the lever 25 of the actuating element 27 extends through the slot-shaped window 21 so that the actuating element 27 can be accessed or actuated from the outside A.

The actuating element 27 is coupled to the two support elements 19 in a force-transmitting manner. Rotation of the actuating element 27 which is configured as a spindle 31 about the axis of rotation 33 results in translation of the support elements 19 in a radial direction R. The actuating element 27 has two force transmission sections 35. The force transmission sections 35 are located in the direction of the shaft longitudinal axis L viewed on height of the support elements 19.

In the force transmission sections 35, the spindle 31 exhibits a cross-section deviating from the circular shape. The cross-section of the spindle 31 in a force transmission section 35 is shown in the cross-sectional view B-B. In the preferred embodiment, the force transmission section 35 is formed by a cross-sectional flattening 37. Due to the cross-sectional flattening 37, recesses 39 are formed in the actuating element 27. The recesses 39 are shown in the longitudinal section AA.

In the following, the form of the support elements 19 is discussed. Subsequently, the interaction of the actuating element 27 with the support elements 19 is described.

The support members 19 are spaced apart along the shaft longitudinal axis L. A first support member 19a is arranged in the region of the contact surface 7. A second support element 19b is arranged in the region of the holding protrusion 13. In this way, a tilting of the stop point 1 in an opening (not shown here) can be effectively prevented. The support elements 19 can be moved out of the shaft 9. They penetrate the wall 17 of the shaft 9 transversely to the shaft longitudinal axis L. In the insertion position E, the support elements 19 are arranged in the recesses 39 in the actuating element 27. They are preferably located at the cross-sectional flattenings 37.

For abutment on the cross-sectional flattenings 37, the support elements 19 have flat rear sides 41. On their external sides 43 opposite the rear sides 41, the support elements 19 each have the shape of a cylinder lateral surface. Thereby, one cylinder axis runs parallel to the shaft longitudinal axis L. The shape of the external side 43 can be selected in such a way that it approximately corresponds to the course of an inner wall of the opening into which the stop point is to be inserted (not shown here).

Alternatively, the outside 43 can also follow the surface course of the shaft 9, at least in the insertion position E. This is shown in the sectional view B-B.

In order to facilitate the insertion of the stop point 1 into an opening 61, the support elements 19 comprise starting slopes 45. The starting slopes 45 are formed on the sides of the support elements 19 facing the end 11. They rise from the end 11 to the stop region 3. The starting slopes 45 can be used to move the support elements 19 into the shaft interior 29 when the stop point 1 is inserted into an opening.

The support elements 19 may have on their rear sides 41 cross-sectional widenings 53 extending transversely to the shaft longitudinal axis L which may serve to prevent the support elements 19 from falling out of the shaft 9 or through the penetration openings 15.

As counterparts to the cross-sectional widenings 53, in the region of the at least one penetration opening 15, the shaft 9 exhibits pressure partings 54, which prevent the support element 19 from falling out of the shaft 9 by positive locking with the cross-sectional widenings 53. The pressure partings 54 can be formed into the penetration opening 15 after inserting the support element 19.

The support elements 19 are preferably arranged transverse to the shaft longitudinal axis L at the end 11 of the shaft 9 opposite the holding protrusion 13. In the region of the holding protrusion 13 the shaft 9 preferably has a circular cross-section. The diameter 47 of the shaft 9 in the region of the holding protrusion 13 is preferably slightly smaller than an inner diameter of the opening for which the stop point 1 is provided.

In the shaft interior 29 at the height of the holding protrusion 13, preferably a return element 49 in the form of a spring 51 is arranged which is connected both to the shaft 9 and to the actuating element 27 so that the return element 49 exerts a force on the actuating element 27 which preferably moves the actuating element 27 from the insertion position E into a holding position (not shown here yet). The spring 51 is preferably a spiral spring which extends about the shaft longitudinal axis L. The return element 49 simultaneously forms a locking device 52 which secures the stop point 1 in the holding position H.

FIGS. 3 and 4a-4d show the stop point 1 from FIGS. 1 and 2a-2d in the holding position H. For the sake of conciseness, only the differences to the previously described insertion position E will be discussed.

In the holding position H, the support elements 19 are moved out of the shaft 9 so that they protrude beyond the wall 17 of the shaft 9. The support elements 19 are moved away from the holding protrusion 13. In the holding position H, the support elements 19 preferably protrude from the shaft 9 to such an extent that a maximum thickness 55 of the shaft 9 together with the protruding support elements 19 transverse to the shaft longitudinal axis L corresponds to the diameter 47 of the end 11 in the region of the holding protrusion 13 when viewed from the shaft longitudinal axis L.

In other words: The projection 56 of the support elements 19 corresponds essentially to the projection 58 of the holding protrusion 13. The projections 56 and 58 refer to the distance to the outer circumference 60 of the shaft 9.

The thickness 55 therefore essentially corresponds to an inner diameter of an opening into which the stop point 1 is to be inserted. This means that the stop point 1 can be held in an opening with little or no play. In the same way, tilting transverse to the shaft longitudinal axis L can be effectively prevented.

The support elements 19 were moved to the holding position H by actuating the actuating element 27. This may have been done, for example, by moving the lever 25 of the actuating element 27 to the holding position. The movement of the actuating element 27 has led to a rotation of the spindle 31 about the shaft longitudinal axis L or about the axis of rotation 33. As a result, the cross-sectional flattening 37 of the actuating element 27 has moved away from the rear side 41 of the respective support element 19 so that the spindle 31 abuts the rear side 41 with its full width 57. The spindle 31 therefore requires more space in the force transmission sections 35. This space is released by outwardly moving support elements 19.

In the holding position H, the cross-sectional flattening 37 is preferably perpendicular to the rear side 41 of the support element 19. Preferably, the rear side 41 of each of the two support elements 19 abuts against a region of the spindle 31 in which it has its full spindle width 57 and has no contact with the cross-sectional flattening 37. In this way, force transmission of the support elements 19 to the spindle 31 in the region of the cross-sectional flattening 37 can be avoided. This, in turn, is advantageous in order to prevent the actuating element 27 from jumping back into the insertion position.

In addition, the fact that the return member 49, designed as a spring 51, holds the actuating element 27 in the holding position H by exerting a spring force on the actuating element 27 in the direction of the holding position H can contribute to safety.

Alternatively or additionally, the stop point 1 can also have at least one further locking device. For example, the stop point 1 may have a further locking device (not shown here) which positively secures the actuating element 27, in particular the lever 25, against movement out of the holding position H. For example, the stop region 3 could have a notch, a split pin or a latch, which can prevent the lever 25 from moving out of the holding position H.

In the following, the holding position H of the stop point 1 already described with reference to FIGS. 3 and 4a-4d is described with reference to FIGS. 5a-5d. The stop point 1 corresponds to the previously described embodiment of the stop point 1. The holding position H is also identical to the holding position H described with reference to FIGS. 3 and 4a-4d. In addition, a sleeve 59 is shown in FIGS. 5a-5d, which can be used as an example for an object with an undercut opening 61. In the case of the sleeve 59, the undercut 63 is formed by the sleeve end 65 or released by it.

In the holding position H, as already described, the support elements 19 are moved out of the shaft 9 so that the thickness 55 of the stop point 1 at the height of the support elements 19 corresponds to the diameter 67 of the opening 61. As a result, both support elements 19 are abutting loosely or under pressure against the wall 69 of the opening. A movement of the stop point 1 transverse to the shaft longitudinal axis L can thus be effectively prevented.

In order to allow the stop point 1 or its shaft 9 to be inserted smoothly into the opening 61, the diameter 47 in the region of the holding protrusion 13 is preferably smaller than the inner diameter 67 of the opening 61.

The holding protrusion 13 is arranged in the undercut 63 or behind the end 65 of the sleeve 59 and abuts against the sleeve 59. This creates a positive locking connection between the holding protrusion 13 and the sleeve 59 in the direction of the shaft longitudinal axis L and the stop point 1 is securely held.

Figure 6:
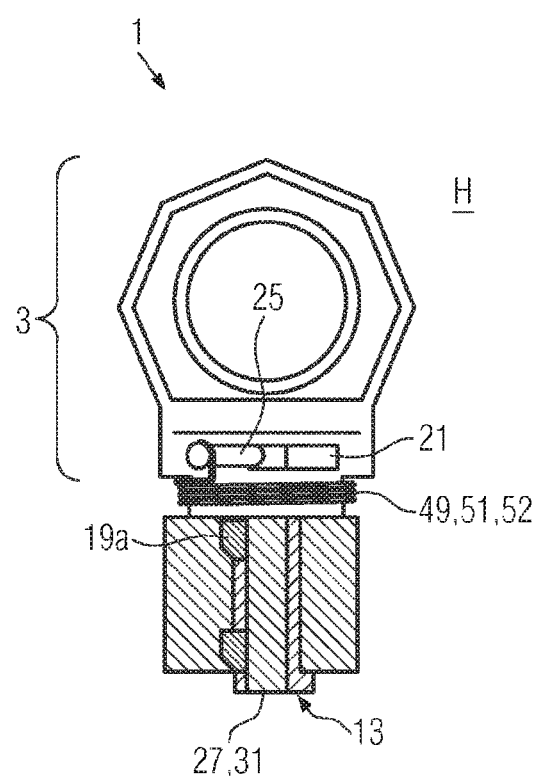
FIG. 6 shows a second embodiment of the stop point according to the invention.

FIG. 6 shows a second preferred embodiment of the stop point 1 according to the invention. For the sake of conciseness, only the differences to the first embodiment described with reference to FIGS. 1 to 5d are described.

The second embodiment of stop point 1 does not have a return element 49 which is arranged in the shaft interior 29. Instead, it has a return element 49 in the form of a spring 51 which is arranged between the slot-shaped window 21 and the first support element 19a. The return element 49 is configured as a spiral spring 51 which is wound on the outside around the stop point 1 in the stop region 3. The spring 51 is attached to the lever 25 and at a point not shown at the stop point 1. The spring 51 is preferably preloaded in such a way that it exerts a force on the lever 25 to the holding position H. The spring 51 is then wound to the lever 25 at a not shown position at the stop point 1. The return element 49 represents a locking device 52 for the stop point 1.

Figure 7:
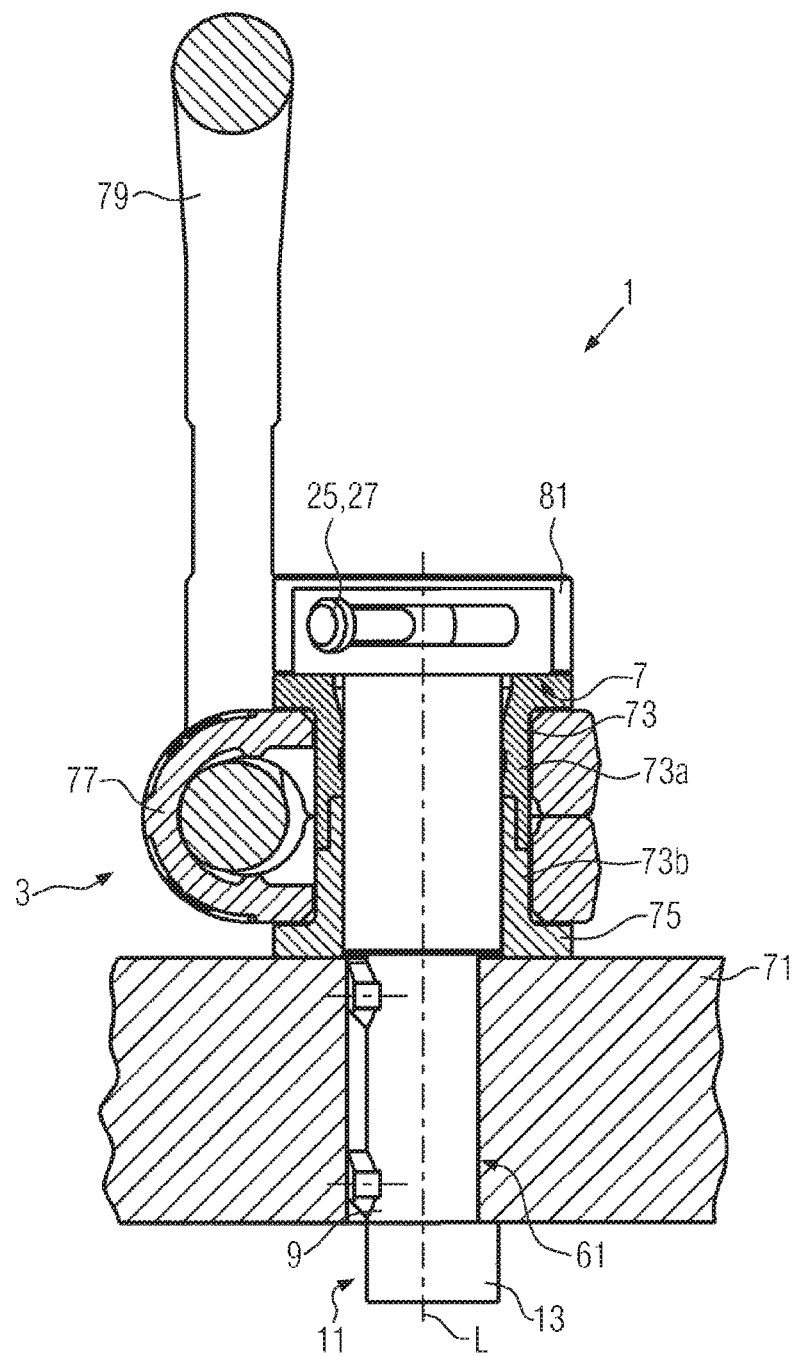
FIG. 7 a third embodiment of the stop point according to the invention.

A third preferred embodiment of the stop point according to the invention is shown in FIG. 7. The stop point 1 of the third embodiment preferably has a shaft 9 and a holding protrusion 13 like the first embodiment described with reference to FIGS. 1 to 5d. Alternatively, the stop point 1 in this region can also be configured as the second design described with reference to FIG. 6.

The following only deals with the differences to the previously described embodiments.

In contrast to the embodiments described above, the stop region 3 of the third embodiment is rotatably mounted in relation to the shaft 9.

For this purpose, the stop point 1 with its contact surface 7 does not abut directly against the object 71 having the opening 61. Instead, the stop point 1 has a bearing sleeve 73 which abuts against the contact surface 7 and is penetrated by the shaft 9. The bearing sleeve 73 extends along the shaft longitudinal axis L in the direction of the end of the shaft 9.

In an assembled state, as shown in FIG. 7, a lower end of 75 of the bearing sleeve 73 is abutting object 71. The bearing sleeve 73 is preferably a two-piece bearing sleeve 73, composed of an upper sleeve part 73a and a lower sleeve part 73b. This makes it easier to assemble the stop point. Alternatively, the bearing sleeve 73 can also be formed in one piece.

The bearing sleeve 73 is preferably fixed to the shaft 9. However, a movable connection is not excluded.

The bearing sleeve 73 penetrates a connection part 77, which is provided with a stop part 79. The stop part 79 may be an eye, a hook, a shackle or any other suitable means of attaching a stop device (not shown). There may be at least one rolling bearing between the bearing sleeve 73 and the connecting part 77. Suitable rolling bearings are, for example, antifriction bearings or ball bearings.

In the rotatable embodiment, the lever 25 of the actuating element 27 is accessible at a head 81 of the stop point 1 opposite the end 11 and belonging to the stop region 3. The slot 23, through which the lever 25 protrudes, is arranged in this head 81.

As an alternative to the embodiment with a bearing sleeve 73, the stop point 1 can also have a connecting part 77, which is penetrated by the shaft 9 without an intermediate bearing sleeve 75.

BEZUGSZEICHEN 1 stop point
3 stop region
5 eye
7 contact surface
9 shaft
11 end
13 holding protrusion
15 penetration opening
17 wall of the shaft
19 support elements
21 window
23 slot
25 lever
27 actuating element
29 shaft interior
31 spindle
33 axis of rotation
35 force transmission section
37 cross-sectional flattening
39 recess
41 rear side
43 external side
45 starting slope
47 diameter
49 return element
51 spring
52 locking device
53 cross-sectional widening
54 pressure partings
55 thickness
56 projection of the support element
57 spindle width
58 projection of the holding protrusion
59 sleeve
60 circumference of the shaft
61 opening
63 undercut
65 sleeve end
67 inner diameter of the opening
69 inner wall of the opening
71 object
73 bearing sleeve
73a upper sleeve part
73b lower sleeve part
75 lower end of the bearing sleeve
77 connection part
79 stop part
81 head
A outside
E insertion position
H holding position
L shaft longitudinal axis
R radial direction

The invention claimed is:

1. Stop point for inserting into an undercut opening, wherein the stop point has a stop region and least one support element between a holding protrusion and the stop region, wherein the holding protrusion and the at least one support element are movable relative to one another, the stop point further comprising a shaft which extends along a shaft longitudinal axis (L) away from the stop region for inserting into the opening, wherein the at least one support element is configured to be movable transversely to the shaft longitudinal axis (L) relative to the shaft, and said holding protrusion on the shaft end facing away from the stop region, said protrusion protruding transversely to the shaft longitudinal axis (L), characterized in that the holding protrusion is immovably connected to the shaft.

2. Stop point according to claim 1, characterized in that the shaft has at least two support elements spaced apart along the shaft longitudinal axis (L).

3. Stop point according to claim 2, characterized in that a first support element is arranged on a shaft-side contact surface of the stop region and a second support element is arranged on the holding protrusion.

4. Stop point according to claim 1, characterized in that the at least one support element can be moved out of the shaft.

5. Stop point according to claim 4, characterized in that the at least one support element penetrates a wall of the shaft transversely to the shaft longitudinal axis (L).

6. Stop point according to claim 1, characterized in that the at least one support element has the shape of a cylinder lateral surface on an outer side.

7. Stop point according to claim 1, characterized in that the stop point has an actuating element which is accessible at the stop region and which is coupled in a force-transmitting manner to the at least one support element.

8. Stop point according to claim 7, characterized in that the at least one actuating element is configured as a spindle which is arranged in the shaft interior and whose axis of rotation is configured coaxially with the shaft longitudinal axis (L).

9. Stop point according to claim 8, characterized in that the spindle for force transmission to the at least one support element in at least one force transmission section has at least one cross-section deviating from a circular shape.

10. Stop point according to claim 7, characterized in that the stop point has at least one return element which is coupled to at least one actuating element by means of which the actuating element can be moved into the holding position (H).

11. Stop point according to claim 10, characterized in that the at least one return element is configured as a spring which is arranged in the shaft interior (29) and which, imparting a spring force, is connected both to the shaft and to the actuating element.

12. Stop point for inserting into an undercut opening, wherein the stop point has a stop region and least one support element between a holding protrusion and the stop region, wherein the holding protrusion and the at least one support element are movable relative to one another, the stop point further comprising a shaft which extends along a shaft longitudinal axis (L) away from the stop region for inserting into the opening, and said holding protrusion on the shaft end facing away from the stop region, said protrusion protruding transversely to the shaft longitudinal axis (L), characterized in that the holding protrusion is immovably connected to the shaft, and characterized in that there is a holding position (H) in which the at least one support element and the holding protrusion are arranged diametrically opposite one another with respect to the shaft longitudinal axis (L).

13. Stop point for inserting into an undercut opening, wherein the stop point has a stop region and least one support element between a holding protrusion and the stop region, wherein the holding protrusion and the at least one support element are movable relative to one another, the stop point further comprising a shaft which extends along a shaft longitudinal axis (L) away from the stop region for inserting into the opening, and said holding protrusion on the shaft end facing away from the stop region, said protrusion protruding transversely to the shaft longitudinal axis (L), characterized in that the holding protrusion is immovably connected to the shaft, and characterized in that the at least one support element has at least one starting slope rising from the end towards the stop region.

* * * * *